Patented June 6, 1933

1,912,671

UNITED STATES PATENT OFFICE

HAROLD M. VAN HORN, OF PRINCETON, NEW JERSEY, AND MICHELE CROCE, OF CHELTENHAM, PENNSYLVANIA, ASSIGNORS, BY MESNE ASSIGNMENTS, TO SLOANE-BLABON CORPORATION, OF NEW YORK, N. Y., A CORPORATION OF DELAWARE

COVERING COMPOSITION AND PROCESS OF MAKING SAME

No Drawing.   Application filed January 6, 1930. Serial No. 418,986.

This invention relates to the art of making fabric-backed or felt-backed materials and contemplates a novel and improved product and process for making same. The product is similar in appearance to the various grades of linoleum and felt base covering material well known in the art, but includes the novel feature of having incorporated in the composition used in the production thereof, reclaimed rubber as a binding medium. The process is generally similar to the known processes of making linoleum in that the various raw materials are mixed together into a composition which may be (1) calendared onto a continuous backing material, or (2) molded thereon in various colors and designs and then pressed into a unitary sheet, or (3) various colors of the composition may be calendared into sheets and designs cut from these calendared sheets pressed onto and into a continuous backing. The process differs, however, from that used in the manufacture of rubber goods of the floor covering type in that it is necessary, in the latter process, to cure particular compositions in presses for considerable periods of time, under heat thus making the operation intermittent rather than continuous and limiting production to the length of time required for vulcanization in the press rather than to the speed or capacity of the molding or forming apparatus. In the linoleum industry on the other hand, coverings are obtained by means of substantially continuous processes wherein production is determined by the capacity of the molding or forming apparatus. This invention is particularly directed to the utilization of such continuous processes for the production of compositions composed substantially of reclaimed rubber as a binder, which compositions may be bonded to fabric or felt backings to provide floor coverings or the like.

An object of this invention is to utilize continuous methods to produce an article composed essentially of a binder of reclaimed rubber.

Another object of this invention is to obtain a new article of manufacture, similar to linoleum, in which some of the various expensive and/or impractical binding materials used in the manufacture of linoleum are replaced by reclaimed rubber.

A further object of the invention is to provide a novel process by which material resembling plain, battleship, jaspe, straight line, molded inlaid and printed linoleum, cork carpet or felt base material, may be obtained.

A further object of the invention is to produce an article which is simple in construction and easy of manufacture and which is suitable as a competitive product to the various grades of linoleum, felt base coverings, rubber tiling and flooring and other covering materials at present manufactured and sold.

A still further object of the invention is to adapt a composition composed essentially of reclaimed rubber as a binder, to the manufacture of all grades of linoleum or felt base coverings or to any fabric backed composition made by continuous processes.

The above mentioned linoleum manufacture consists generally in mixing a suitable filler such as ground cork, wood flour, or the like with a binder such as Walton cement, Taylor cement or other cementitious material of the oleoresinous type together with suitable pigments which are necessary for the particular result sought. These cements are well known in the art and are composed essentially of oxidized or polymerized oils, rosin and kauri gum, or the like, which cements require considerable periods of time for their preparation. We have discovered that these binders may be replaced, in whole or in part by reclaimed rubber, when formulæ adjustments have been made. A superior product is thus obtained which possesses all the advantages and good qualities of a linoleum or felt base material and which meets all the specifications ordinarily required of such products.

Attention is directed to the fact that the process by which the reclaimed rubber used in the practice of this invention is obtained, is not a part of this invention, as this material is used in our process in the state it is obtained from the reclaimed rubber manufacturer.

As an example of the rubber composition which we have developed, the following serves to produce a satisfactory product when processed in accordance with the principles herein laid down:

|  | Percent |  |
|---|---|---|
| Reclaimed rubber | 28 | (binder) |
| Wood flour | 40 | (filler) |
| Lithopone | 26 | (Pigments) |
| Whiting | 2 | |
| Zinc oxide | 3 | (Curing or oxidizing agents) |
| Sulphur | 0.25 | |
| Accelerator | 0.75 | |

We do not wish to be limited to the exact proportions indicated in the above formula, which is merely illustrative of one form of our invention. The general composition will conform substantially to the above formula, but, where light shades are desired we have found it expedient to incorporate with the reclaimed rubber above mentioned a small quantity of raw rubber. It should be understood that under certain conditions it may be expedient to incorporate with the reclaimed rubber binder a small percentage of Walton cement, Taylor cement, or other similar cementitious materials known to the industry. It should be noted that the percentage of accelerator must also be varied according to the requirements of the reclaimed rubber and other ingredients used. Furthermore, it may be necessary to incorporate in the above formula a small percentage of an anti-oxident in order to overcome any over-oxidation that might occur. Moreover, it is not indispensable that we use wood flour entirely as a filler, for we have found that it is sometimes expedient to incorporate ground cork, cotton linters, peanut shells, ground corncobs, or other material in place of this ingredient. It is also evident that the above formula includes only pigments for a light colored product, and it is contemplated of course that these pigments are to be changed in accordance with the color desired in the finished article. "Pigments" in the above formula includes such raw material as lithopone, zinc oxide, chrome green, ultramarine blue, slate flour, ground silica, flint, whiting, etc. The ingredients included in the above formula under "curing or oxidizing agents" need not necessarily be limited to the items listed as we have found that paraffine oil, paraffine wax, stearic acid or other softening agents may be used to advantage. It is obvious, therefore, that the variations in the mixture for which a formula is given depend on the results desired as to shade and appearance.

In preparing the novel article of manufacture herein disclosed we take reclaimed rubber and grind it through the ordinary roll grinder or suitable mechanical device used in "grinding" or "sheeting" the usual known cements which constitute the linoleum binders in the linoleum process. Next, this ground binding material is put through a heavy duty machine such as a German mixer or Banbury mixer together with the various other ingredients required. The composition so produced is then handled in accordance with the requirements of the finished product desired, for example: To produce a product similar to molded inlaid linoleum the composition is disintegrated or "scratched" into a granular form, for example by contacting the composition wound upon a roller with teeth or pins upon an adjacent roller travelling at high speed, sieved to the desired particle size, run through the equipment used in making molded inlaid linoleum, pressed into a sheet on a backing material, and in this form taken to an oven or drier for final curing. To make a product similar to straight line linoleum, the composition is calendered into a sheet and placed into the equipment used in making straight line inlaid linoleum, the composition being cut out by the equipment and then pressed onto the backing material and taken to an oven or drier for final curing. To produce a material similar to plain, battleship or jaspe linoleum, or a body for making printed linoleum, the composition is calendared on the backing material and run directly into heaters for the cure.

By "curing" and "cure" as above set out we intend merely to designate the general process through which the composition passes after it is formed into a sheet. In making both straight line and molded material we have discovered that a certain amount of curing takes place during the pressing or calendaring operation alone, yet the process is not dependent on a complete cure at this point. In making material similar to plain battleship or jaspe linoleum or cork carpet, we have found that a certain amount of curing also takes place during the calendaring operation, yet, similarly, the process is not dependent upon a complete cure at this point. It is important to note that the time required in curing the material after formation is considerably less than that required for curing ordinary linoleum, thus eliminating dead storage cost, simplifying manufacture, and greatly minimizing the amount of material in process. After the materials are formed into a sheet, it is run into heated rooms and subjected to the ordinary curing process which is used in the manufacture of the same type of goods in the linoleum and felt base covering industry. In other words, the material can be treated in precisely the same manner as is linoleum and sufficient curing is obtained by the apparatus now in use in that industry.

It is apparent from the above that the invention permits the use of a reclaimed rubber composition in the manufacture of fabric or felt backed material without change in the equipment now used in the manufacture of linoleum and felt base coverings. Thus a continuous rubber composition covering can be produced without the necessity of a large outlay for new machinery. The material is produced in rolls of convenient size for handling in the field, eliminating the necessity of skilled hand labor now necessary in laying individual rubber tiles as manufactured by the limited production methods of the rubber covering and flooring industry. Moreover, by reason of its simplicity and ease of manufacture the product is available to consumers who are not able to afford the cost of buying and laying individual rubber tiling as now manufactured. Further, the finished product is superior to present day linoleum inasmuch as the binder is more resistant to the action of the soaps generally used in cleansing, and the material is vastly more pliable and flexible than is linoleum, is considerably stronger and can be laid in cold weather without danger of cracking.

In the preparation of Walton cement it requires four to six months to properly prepare the material for use, especially when scrim oil is used. Scrim oil itself requires sixty to ninety days to prepare. In the manufacture of the novel composition material herein disclosed, the reclaimed rubber binder is obtained from the source of supply and is ready for immediate use when received at the manufacturing plant, thus eliminating the necessity of ageing, storing and working as is required in producing the binding agents now used.

In making linoleum products it has been found that certain pigments and coloring agents exercise an oxidizing effect on the binders at present utilized, making it necessary that only minimum amounts of colored composition be manufactured before processing. Our new composition, however, can be made in large quantities and can remain mixed with pigments for considerable periods of time without affecting the quality or color of the product.

The material may be coated either before it is run into the curing ovens, or after it is taken therefrom, with a finishing material such as lacquer, varnish, shellac, oil, wax, or other surfacing material and subsequently waxed or polished to give a hard, wear-resisting, pleasing finish.

Having thus described our invention, we claim:

1. The process of making covering material comprising grinding a binder of reclaimed rubber, mixing it with a filler, pigments, curing agents and an accelerator, disintegrating this mixture into granular form, sieving it to a desired particle size onto predetermined areas of a continuous fabric sheet, then pressing with the application of heat, the resultant composition onto said continuous fabric and curing the finished product.

2. The method of making floor covering which comprises mixing together a composition consisting essentially of a pulverulent cellulosic filler, pigment, rubber binder and curing ingredients, distintegrating the resulting mass to granular form and applying it in such loose granular form of desired particle size onto predetermined areas of the continuous fabric sheet and then pressing with the application of heat the resultant composition onto said continuous fabric and curing the finished product.

Signed at Philadelphia, in the county of Philadelphia and State of Pennsylvania, this 5th day of December, A. D. 1929.

HAROLD M. VAN HORN.
MICHELE CROCE.